TWO TERMINAL STORAGE CIRCUIT EMPLOYING SINGLE TRANSISTOR AND DIODE COMBINATION

Filed Feb. 17, 1964

INVENTOR
JOHN L. MOLL
BY A. C. Smith
AGENT

United States Patent Office 3,299,290

Patented Jan. 17, 1967

3,299,290

TWO TERMINAL STORAGE CIRCUIT EMPLOYING SINGLE TRANSISTOR AND DIODE COMBINATION

John L. Moll, Stanford, Calif., assignor to Hewlett-Packard Company, Palo Alto, Calif., a corporation of California Filed Feb. 17, 1964, Ser. No. 345,418

3 Claims. (Cl. 307—88.5)

This invention relates to a two terminal storage circuit.

The use of a step recovery diode to form a two terminal storage circuit is known. The potential difference between the two terminals is given a polarity to cause a charging or forward current to flow in the circuit and store a limited amount of charge in the step recovery diode. Reversal of the potential difference polarity causes a discharging or reverse current to flow in the circuit until the charge stored is depleted. Depletion of the charge stored is caused both by the reverse current and recombination. Large reverse currents deplete the stored charge very quickly resulting in short storage times relative to the recombination time which is the maximum possible storage time.

Accordingly, it is the principal object of this invention to provide a storage circuit having a storage time which is substantially dependent only on the recombination time.

In accordance with the illustrated embodiment of this invention, a charging path comprising a first diode and the base and collector regions of a transistor is connected intermediate a first and a second terminal. Charging currents flowing in the charging circuit store a minority carrier density charge in the base region. A discharging path comprising a second diode and the collector, emitter, and base regions of the transistor is also connected intermediate the first and second terminals. Discharging currents flowing in the discharging circuit do not deplete the stored minority carrier density charge. Thus even for large discharging currents the maximum storage time of the circuit is substantially dependent only on recombination.

Figure 1:
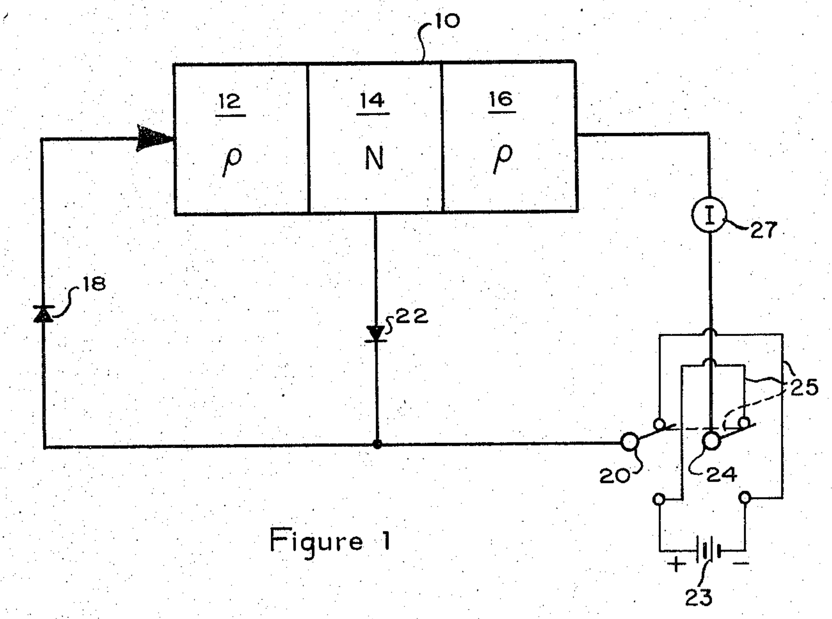
Figure 2:
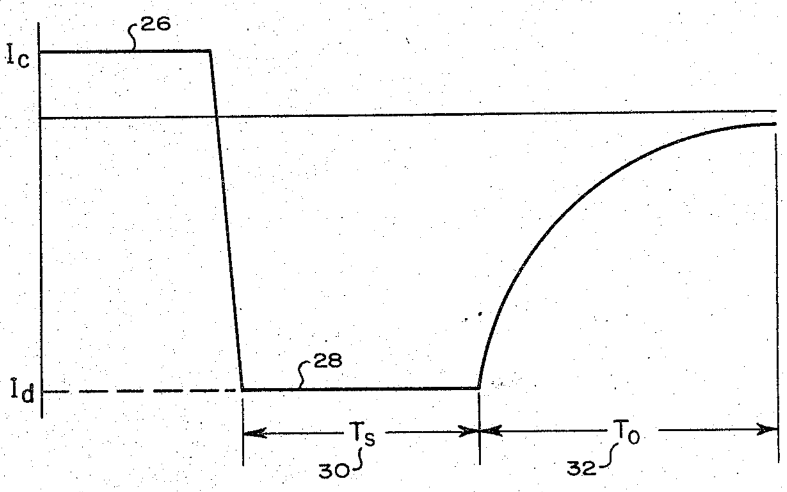

Other and incidental objects of this invention will be apparent from a reading of this specification and an inspection of the accompanying drawing in which:

FIGURE 1 is a schematic representation of a storage circuit according to this invention; and FIGURE 2 is a graph of current versus time during the charging and discharging cycles of operation of the circuit of FIGURE 1.

Referring to FIGURE 1, there is shown a transistor 10 of PNP conductivity type having emitter, base, and collector regions 12, 14 and 16 respectively. A diode 18 is serially connected intermediate emitter region 12 and terminal 20 to prevent reverse current flow out of emitter region 12. The circuit works substantially the same with or without diode 18. However, if the reverse transistor Alpha is high, charge will flow in the reverse direction through the emitter 12 during a charging cycle. Diode 18 prevents this flow of charge. Another diode 22 is serially connected intermediate base region 14 and terminal 20 to prevent reverse current flow into base region 14. Collector region 16 is connected to terminal 24. A potential source 23 is connected to the terminals 20 and 24 by a switch 25 which is connected for reversing the polarity of the potential supplied to each terminal.

Referring now to both FIGURE 1 and FIGURE 2, which show the current flow as it is indicated for each position of the switch 25 by an ammeter 27 connected intermediate to the terminal 24 and the collector 16, the operation of the circuit is described. A positive potential is imposed on terminal 24 and a negative potential on terminal 20, as indicated when the switch 25 is in the position shown, causing a charging current 26 to flow therebetween along a charging path comprising collector region 16, base region 14 and diode 22. Charging current 26 stores a minority carrier density charge in base region 14.

Reversing the polarities of the potentials imposed on terminals 20 and 24, as indicated when the switch 25 is actuated to the alternate position, causes a discharging current 28 to flow therebetween along a discharging path comprising diode 18, emitter region 12, base region 14, and collector region 16. Discharging current 28 replaces the minority carriers it displaces from base region 14 with similar carriers from emitter region 12. Thus discharging current 28 will continue flowing until the minority carrier density charge stored in base region 14 is depleted by recombination. The total charge flowing through diode 18 and transistor 10 is therefore many times greater than the minority carrier density charge initially stored in base region 14 by charging current 26.

The storage time 30 of the minority carrier density charge stored in base region 14 is substantially dependent only on the recombination time even for large discharging currents 28. Storage times 30 in the range from ten nanoseconds to two microseconds are possible with the high gain transistors required in most applications. The recovery time of diodes 18 and 22 should be short with respect to the storage time 30. Decay time 32 is the time required for discharging current 28 to fall to ten percent of its maximum value. The decay time 32 is decreased as higher frequency transistors are used.

I claim:

1. A signal circuit comprising:

first and second terminals;

a transistor having collector, base, and emitter regions:

first circuit means including a first diode and connecting said collector and base regions and said first diode intermediate to said first and second terminals for forming a unidirectional charging path including said collector and base regions and said first diode, said first diode being connected intermediate to said base region and to said first terminal and being poled in a direction determined by the conductivity type of said base region;

second circuit means including a second diode and connecting said second diode and said emitter, base, and collector regions intermediate to said first and second terminals for forming a unidirectional discharging path including said second diode and said emitter, base, and collector regions, said second diode being connected intermediate to said emitter region and to a point between said first diode and said first terminal and being poled in a direction determined by the conductivity type of said emitter region; and means connected to said first and second terminals for applying a potential difference of one polarity therebetween so as to provide a charging current in said unidirectional charging path and for subsequently applying a potential difference of opposite polarity therebetween so as to provide a discharging current in said unidirectional discharging path.

2. A two terminal storage circuit comprising:

only first and second terminals;

a transistor having collector, base, and emitter regions and having a minority carrier storage capability;

first circuit means including a first unidirectional conducting element and connecting said collector and base regions and said first unidirectional conducting element intermediate to said first and second terminals for forming a unidirectional charging path including said collector and base regions and said first unidirectional conducting element, said first unidirectional conducting element being connected intermediate to said base region and to said first terminal;

second circuit means connecting said emitter, base, and collector regions intermediate to said first and second terminals for forming a discharging path including said emitter, base, and collector regions; and means connected to said first and second terminals for applying a potential difference of one polarity therebetween so as to provide in said unidirectional charging path a charging current that stores a minority carrier density charge in said base region and for subsequently applying a potential difference of opposite polarity therebtween so as to provide in said discharging path a discharging current that displaces minority carriers from the base region but substantially replaces them with similar carriers from the emitter region, whereby the storage time of the minority carrier density charge in the base region is substantially dependent only on the recombination time.

3. A two terminal storage circuit as in claim 2 wherein said second circuit means includes a second unidirectional conducting element connected in said discharging path intermediate to said emitter region and to a point between said first unidirectional conducting element and said first terminal.

References Cited by the Examiner

UNITED STATES PATENTS

| | | | |
|---|---|---|---|
| 2,913,600 | 11/1959 | Cunningham et al. | 307—88.5 |
| 3,144,563 | 8/1964 | Cohler et al. | 307—88.5 |
| 3,200,343 | 8/1965 | Skinner | 307—88.5 |

ARTHUR GAUSS, *Primary Examiner.*

J. S. HEYMAN, *Assistant Examiner.*